United States Patent [19]
Kelliher et al.

[11] Patent Number: 5,857,194
[45] Date of Patent: Jan. 5, 1999

[54] AUTOMATIC TRANSMISSION OF LEGACY SYSTEM DATA

[75] Inventors: Timothy Patrick Kelliher, Scotia; Jeanette Marie Bruno, Saratoga Springs, both of N.Y.

[73] Assignee: General Electric Company, Schenectady, N.Y.

[21] Appl. No.: 772,634

[22] Filed: Dec. 23, 1996

Related U.S. Application Data

[60] Provisional application No. 60/029,558 Nov. 7, 1996.

[51] Int. Cl.[6] .................................................. G06F 17/30
[52] U.S. Cl. ........................ 707/101; 707/101; 707/104; 707/2; 395/500
[58] Field of Search .................................. 707/512, 104, 707/4, 101; 705/2; 395/500

[56] References Cited

U.S. PATENT DOCUMENTS

| | | | |
|---|---|---|---|
| 5,301,105 | 4/1994 | Cummings, Jr. .............................. | 705/2 |
| 5,604,896 | 2/1997 | Duxbury et al. .......................... | 395/500 |
| 5,634,053 | 5/1997 | Noble et al. .................................. | 707/4 |
| 5,664,109 | 9/1997 | Johnson et al. .............................. | 705/2 |
| 5,678,044 | 10/1997 | Pastilha et al. ........................... | 707/104 |

OTHER PUBLICATIONS

Johnson M. Hart and Antonio Pizzarello, A Scaleable, automated process for year 2000 system correction, IEEE, and 475–484, Mar. 1996.

William Wei Song, Integration issues in information system reengineering, IEEE, and 328–335, Aug. 1996.

"Electronic Commerce Services ECS" overheads of presentation by Raj Chopra, given at the Nat'l. Instit. of Sci. & Tech. (NIST) Program Review pursuant to the HIIT contract, Gaithersburg, MD, Jan. 24, 1996.

"Generating Interfaces to Legacy Systems Data" overheads of presentation by Jeanette Bruno, Timothy Kelliher at the Working Conference on Reverse Engineering, Monterrey, CA, Nov. 8, 1996.

*Primary Examiner*—Thomas G. Black
*Assistant Examiner*—Srirama Channavajjala
*Attorney, Agent, or Firm*—Lawrence P. Zale; Marvin Snyder

[57] ABSTRACT

The present invention analyses an existing legacy system, such as a Physician's Office Management System, and automatically extracts, reformats and sends required data to a service company, which may be for example, and insurance company. It begins by feeding the legacy system "seed data" and monitors the legacy system storage device to determine a "raw map" of where and how the seed data is stored. It then culls out multiple records, single records, inconsistent records in the raw map. Control flow information is also extracted. This indicates which fields are "key" fields and are used to extract other information. These key fields must be acquired before their related data. After the data is located and the order is determined, a script is automatically created to extract the data. The data is then extracted and reformatted in a predetermined format determined by the service company, and the required data is automatically sent, by conventional means, to the service company.

7 Claims, 1 Drawing Sheet

AUTOMATIC TRANSMISSION OF LEGACY SYSTEM DATA

This US Patent Application is being filed on an invention from research which was partially funded under a cooperative agreement with the US Federal Government National Institute of Standards and Technology (NIST) Advanced Technology Program, "Health Care Information Infrastructure Technology (HIIT)", contract number: 70NANB5H1011.

This application claims priority of a Provisional Application of the same name by Bruno, Kelliher, Ser. No. 60/029,558 filed Nov. 7, 1996 pending.

BACKGROUND OF THE INVENTION

1. Scope of the Invention

The present invention relates to electronic data transmission, and more specifically a system which automatically finds and transmits information to a service provider in one of a number of standard formats.

2. Related Prior Art

It is sometimes necessary to transmit information from an existing system, a legacy system, to other systems each having a required transmission format. This is the case in many areas but especially for Physician Office Management Systems (POMS) communicating information to insurance providers, such as Aetna, Blue Cross, Prudential etc. POMS are small computer systems used for record keeping in Physicians Offices.

Typically, small interface programs are manually written for each of the different provider standards for the specific POMS being used.

Today there are three ways to integrate with a legacy application:

- write the interface code by hand,
- use a mapping tool, or
- use a screen scraping tool to help implement software for the integration.

Mapping tools

A mapping tool typically supports implementing an insertion or extraction routine from the legacy system. It does not help design the routines. The user of the mapping tool (typically a software engineer) supplies the mapping tool with a layout of the source data, a layout of the target data items and a mapping between the source and target data items. The mapping tool then implements this map.

Screen scraper

A screen scraper is a tool which monitors (and stores) inputs to the computer to determine order and type of screen inputs which are required by the legacy system.

The screen scraper is programmed to monitor a specific legacy system. To program a screen scraper, the user determines the sequence of screens (in the legacy system) needed to retrieve/insert the data from/to the legacy system. The user then runs the legacy application in conjunction with the screen scraper which monitors and identifies the screens that are to be scraped and tags fields in the screens that will be retrieved/filled by the screen scraper.

A user then writes a script (in the screen scraper's programming language) to start up the legacy application, maneuver from screen to screen and retrieve/insert data from/into the tagged fields in the legacy application screens.

After it has been fully programmed, the screen scraper can automatically run the legacy application entering values from an electronic source (such as a data file) into the appropriate user interface fields. It can also generate data files by automatically extracting data from the legacy system's screens.

Currently, there is a need for a system which automatically determines the disk format of the legacy data, and transmits the data required by a service provider to it in its required format.

SUMMARY OF THE INVENTION

The present invention works on existing legacy systems, such as a Physician's Office Management System (POMS) and automatically determines the data format of a storage device of existing legacy system, extracts data required by a service company, such as an insurance company, and transmits the data in one of several predetermined industry standard format.

A set of sample "seed data" is fed to the legacy system, either manually, or by an automated data feeder.

A Data Locator searches said legacy system storage device for locations (table, record, field position) of occurrences of the seed values. It makes a "raw map" indicating the seed values, their location, and the format of the legacy field where each was found.

A Map Refining device receives the raw map from the Data Locator, and culls out false hits from the raw map to produce a clean map.

A Control Flow Analyzer identifies key fields in the clean map used to acquire other data which must be acquired first, and creates control flow information indicating the order of data extraction.

This control flow information and the clean map are passed to an Output Generator which scripts data extraction steps to extract the data in the required order from the legacy system storage device.

An Extraction device executes the data extraction steps and extracts the data from the legacy storage device and passes it to a Transmission device which reformats this data according to a predetermined format, contacts the service company by conventional communications systems, and sends the data in the predefined format to the service company.

OBJECTS OF THE INVENTION

An object of the present invention is to provide a system that determines the data format of an existing system, extracts the data, and transmits the data in a required format.

It is another object of the present invention to provide an automatic interface to transmit data from an existing computer systems to a remote computer system in one of several standard formats.

BRIEF DESCRIPTION OF THE DRAWINGS

The features of the invention believed to be novel are set forth with particularity in the appended claims. The invention itself, however, both as to organization and method of operation, together with further objects and advantages thereof, may be best understood by reference to the following description taken in conjunction with the accompanying drawing in which:

DETAILED DESCRIPTION OF THE INVENTION

Figure 1:
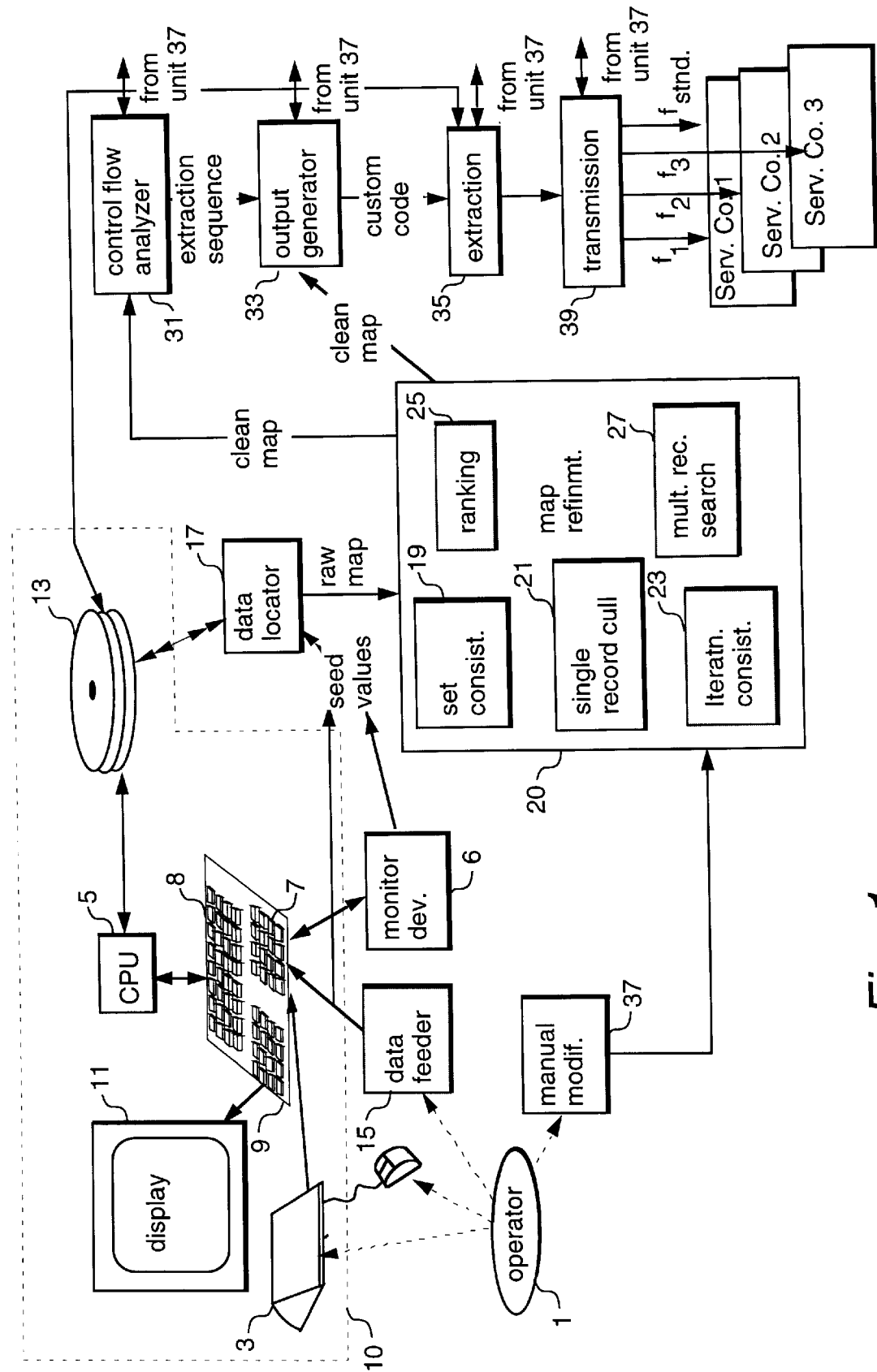
FIG. 1 is a simplified block diagram of an embodiment of the present invention.

The invention described in this document works with an existing system, a "legacy system", and automatically discovers the disk data format, "legacy disk format", determines a map between the legacy data and a target description, which may be a standard format, or user-supplied, and implements this map by either:

generating the source code to implement access to the data directly; or passing the information to a mapping tool, which transmits the legacy data to the service provider.

The present invention not only determines where the legacy values are stored in the legacy disk, but determines access order to key data fields that must be accessed first before other data is accessed.

In FIG. 1 a simplified block diagram of the present invention is shown. Many of the blocks shown are functional blocks and represent a specific function to be accomplished. They may be purely hardware, or software running on hardware, as long as they perform the intended function.

An existing legacy system 10 is shown which may be any type of computer management system, for example a Physician Office Management System (POMS).

Slightly differing subsets of legacy system information is intended to be regularly sent to existing service companies, "Serv. Co. 1", "Serv. Co. 2", "Serv. Co. 3", such as insurance companies, each which has their own unique format, shown here as "$f_1$", "$f_2$", "$f_3$", respectively, or in an industry standard format, "$f_{stnd}$".

In one embodiment, a user 1 initially provides a data feeder 15 with a suggested list of the data fields to extract/insert, the list defining a record. The list of fields is a "domain description" for a record. The domain descriptor should be representative of the legacy system being used. For example, a physician's Office Management System would use fields having information as to a patient's name, social security number, office visit date, diagnosis, charges, etc.

User 1 also provides data feeder 15 with several sets of sample values for each these fields, termed "seed data" representing a number of records. The seed data is selected to be as unique as possible so as not to be confused with existing information on the legacy system. For example, when putting in zip code information, if the system is on the west coast, the majority of existing zip code information will be west coast zip codes, therefore the seed data chosen will be east coast zip codes. The domain description does not contain any information about how the fields are stored in the legacy application.

Data feeder 15 inserts this information into a keyboard buffer 7 of legacy system 10.

In another embodiment, user 1 simply types the information directly into legacy system 10 and a monitor device 6 running a monitor program, keeps track of keyboard input. Monitor device functions may be performed by a legacy system CPU 5, running in a multiprocessing mode. Legacy system employs CPU 5 running legacy application stored in a legacy application memory 8, which may, or may not be part of a contiguous memory device also having a screen buffer 9 and keyboard buffer 7.

Seed data from monitor device 6 or data feeder 15 is passed to a Data Locator 17 coupled to a storage device 13 of legacy system 10.

1) Data Locator

Data Locator 17 performs an exhaustive search of legacy system storage device 13 looking for occurrences of the seed values. Data Locator 17 will use type information of the domain fields to recognize the data values that may be stored in a variety of formats. For example, if the domain field is a date type, then Data Locator 17 will look for matches in the form yyyymmdd, yymmdd, mmddyyyy, mmddyy, etc. Every time a match is found to one of the seed values the tool keeps a "hit list", or "raw map", of the seed values going from domain fields to legacy fields (table, record, record position), where the seed value was found. The raw map also contains the format of the legacy field where the data was stored.

In legacy systems using relational database designs, a query in Structured Query Language (SQL) is first attempted to try to determine the schema, defining the field names, the field types, the order of the fields. SQL is beginning to become a standard and is widely used. If the legacy system supports SQL, Data Locator 17 may directly ask legacy system CPU 5 where each seed value is stored to produce the raw map. Data Locator 17 then creates an file, such as an ASCII text file, containing the raw map information. In an optional embodiment, user 1 may interact with a manual modification unit 37 to read in and modify the ASCII file.

If the legacy system employs a flat database structure, or does not support SQL, an exhaustive search of the storage device 13 is performed.

Data Locator 17 may also have to characterize fields or delimiters that are not contained in the domain description. For instance, if legacy system 10 uses variable length records with comma delimited fields, the extraction routines will have to know to look for the commas. Delimiters can be recognized by finding one character that is repeatedly adjacent to the seed values across all the seed sets. Another example is when the legacy system implements an array of values with a variable length and uses either an array delimiter or stores the array length in some other field. When this occurs, the array delimiter or the length field, stored at some other location on storage device 13 must first be retrieved in order to locate the variable length data array.

2) Map Refining Device

Data Locator 17 produces false hits when seed field values that are not unique across the legacy data fields are chosen. For example, seed data that represent a person's sex and a person's marital status will both have seed values of "M" one to indicate that the person is a male, the other to indicate that the person is married. Assuming the legacy data includes fields for both sex and marital status, Data Locator 17 will find a match to the value "M" in a number of the application fields.

Therefore, a Map Refining device 20 is coupled to Data Locator 17 and receives the raw map. Map Refining device 20 then culls out false hits from the raw map to produce a clean map of domain fields to legacy fields.

Map Refining device 20 may contain several functional units, some of which are required, and others which are optional, but add to the performance of the system.

a) Set Consistency device

A Set Consistency device 19 is coupled to the Data Locator 17 and receives the raw map. It analyses the raw map checking consistency from one seed set to the next. There will be multiple seed sets for a given domain description. Set Consistency device 19 verifies that if domain fieldA in set1 is mapped to legacy fieldB, then domain fieldA for all the other sets must map to legacy fieldB. Maps that are found to be inconsistent are discarded.

b) Single Record Cull Device

A Single Record Cull device 21 culls out single record maps where only one domain field maps to a given record in the legacy application. For example, if seed valueA maps to filed, recordc and no other seed value in that set maps to file 1, recordc, then this mapping is discarded.

c) Iteration Consistency device (optional)

The domain fields may be iterative fields. In an optional embodiment, an Iteration Consistency device 23 received the map after it has been processed by devices 19 and 21 and checks if all iterations of a given domain field map consistently to the same legacy field. It checks to determine if the legacy system is using an array structure to implement an iterative domain field, or has implemented different iterations of the domain field employing a fixed set of fields. For example, if domain fieldA has 10 iterations in the first seed set, and there is a map entry associating iteration 1 to legacy application fieldB , then there should be 9 other maps associating all iterations 2 through 10 to either legacy application fieldB or associating all iterations 2 through 10 to 9 different legacy application fields.

d) Ranking device (optional)

The domain fields are initially grouped by user 1. In another optional embodiment, Map Refining device 20 may employ a Ranking device 25 which receives the map which may have been processed by devices 19, 21, and 23 (if present), that ranks the maps by the number of fields which map to a common record of legacy storage device 13. The set of maps that map the largest set of domain fields to a given legacy record are given the highest ranking. For example:

Given domain fields name, date of birth, sex.

If the sex maps to records 1, 2 and 3 (possibly in different files) and the name and date of birth both map to record 1, but not 2 and 3, then the map associating sex to record 1 is given a higher ranking than the maps associating sex to records 2 and 3.

e) Multiple Record Search device

Map Refining device 20 may optionally also include a Multiple Record Search device 27 receives the map which may have been processed by any of devices 19, 21, 23, 25, if present, and identifies if differing subsets of maps map to different records in the same file. When this occurs, Multiple Record Search device 27 infers that legacy system 10 is using different record layouts within the same file.

In the case of variable length records, and variable length arrays with array delimiters, Map Refining device 20 can recognize that it cannot determine a consistent positioning of the domain fields and it will expand its analysis to look for non-domain fields that regularly delimit the seed values or consistently represent the number of iterations for a given domain field in each seed set. Fields that define array lengths will be fields in the legacy application that do not map to any domain field and consistently contain the number of iterations in the corresponding seed set.

After each of the above devices within Map Refining device 20 have performed their function, an ASCII, or spreadsheet file of the processed maps that were not culled out could be created, and modified by user I with manual modification unit 37. The final output of Map Refining device 20 is a "clean map". The user may optionally update the clean map with entries for the missing domain fields.

3) Control Flow Analyzer

A Control Flow Analyzer 31 is coupled to the Map Refining device 20 and receives its output clean map. It employs the clean map file to identify legacy fields that can be used as keys into the legacy application files. Key fields are fields which are required to get other data, and must be retrieved first. For example, a relational database file is comprised of three tables, entitled "Personal", "Gov't Nos.", and "Insurance". Knowing only the patients name, the Personal table will provide one with a Patient number which the Physician uses to identify this patient. Providing the Patient number to the second table, Gov't. Nos. one receives the Social Security number. Providing the Social Security Number to the third table, Insurance, a list of Insurance Companies, and the past charges to each are provided. Therefore, information from the first two tables are needed before the charges may be obtained.

Based on the key field designations, Control Flow Analyzer 31 schedules the order for reading data from the legacy fields. Control flow analyzer 31 produces control flow information describing the derived control flow as output. Control Flow Analyzer 31 may also produced as an ASCII file as output for possible user modification.

If a Monitor device 6 is employed, control flow information may also be determined by this device and passed to Control Flow Analyzer 31.

If the SQL is operational on legacy system 10, Data Locator 17 may also determine control flow from the schema acquired from legacy system 10.

4) Output Generator

An Output Generator 33 receives the clean map from Map Refining device 20 indicating where domain fields are located within the legacy Data Storage device 13. It also receives the control flow information from Control Flow Analyzer 31 indicating the sequence of extracting data. It then scripts instruction steps to extract the data in the required order.

1. It may script $C^{++}$ routines to extract the data directly from the legacy system storage device 13.

2. Or it may create Mapping tool scripts to direct the mapping tool to extract the data.

5) Extraction Device

An Extraction device 35 is coupled to Output Generator 33, and to legacy disk storage device 13. It is capable of executing scripts created by the Output device 31. Extraction device 35 executes the scripts having the information as to which data to extract, where it is located and the order of data extraction.

6) Transmission Device

The extracted data is passed to a Transmission device 39 which reformats this data according to a predetermined user-selected format, or an industry standard, such as Electronic Data Interchange (EDI) for example set forth in the publication "Medicare Part A Specifications for the ANSI ASC X12 835" dated Jul. 1, 1993. Manual modification unit 37 may be used to select a company to send the extracted data to. This company has a predetermined format which is prestored in Transmission device 35. Transmission device 35 then contacts that company (via conventional communications systems) and sends the data in their predefined format.

While this is described in terms of transmitting data from company to company, it may also be used to transmit data between departments with the same company.

While several presently preferred embodiments of the novel invention has been described in detail herein, many modifications and variations will now become apparent to those skilled in the art. It is, therefore, to be understood that the appended claims are intended to cover all such modifications and variations as fall within the true spirit of the invention.

what is claimed is:

1. A system for automatically determining the data format of a storage device of existing legacy system, extracting the data, and transmitting the data in one of several predetermined formats required by a service company comprising:

a) a data input means for feeding seed data to said legacy system;

b) a Data Locator coupled to said legacy storage device, for searching said legacy system storage device and for storing location (table, record, record position) of occurrences of the seed values in a raw map along with the seed values and the format of the legacy field;

c) a Map Refining device coupled to, and for receiving the raw map from the Data Locator, for culling out false hits from the raw map to produce a clean map of domain fields to legacy fields;

d) a Control Flow Analyzer coupled to, and receiving the output clean map from the Map Refining device for identifying key fields in the clean map used to acquire other data which must be acquired first, and for creating control flow information indicating the order of data extraction;

e) an Output Generator coupled to the Map Refining device and the control flow analyser, for receiving the clean map the control flow information and for creating data extraction steps to extract the data in the required order;

f) an Extraction device is coupled to the Output Generator, and to legacy storage device, for executing the data extraction steps to acquire extracted data;

g) a Transmission device coupled to the Extraction device for receiving the extracted data, for reformating this data according to a predetermined format, for contacting a service company by conventional communications systems, and for sending the data in the predefined format.

2. The system of claim 1 wherein the Map Refining device comprises: a Set Consistency device coupled to the Data Locator which receives the raw map and analyses the raw map checking for consistency from one seed set to the next, discarding inconsistent maps.

3. The system of claim 1 wherein the Map Refining device comprises:

a Single Record Cull device which receives the raw map and culls out single record maps where only one domain field maps to a given record in the legacy application.

4. The system of claim 1 wherein the Map Refining device comprises: an iteration consistency device which receives the raw map and checks if all iterations of a given domain field map consistently to the same legacy field, culling out those which do not.

5. The system of claim 1 wherein the Map Refining device comprises: a ranking device which receives the raw map and ranks the maps by the number of fields which map to a common record of legacy storage device, the set of maps that map the largest set of domain fields to a given legacy record are given the highest ranking.

6. The system of claim 1 wherein the Map Refining device comprises: a Multiple Record Search device which receives the raw map and identifies if differing subsets of maps map to different records in the same file indicating that said legacy system is using different record layouts within the same file.

7. The system of claim 1 wherein the Map Refining device is adapted to search for repeated characters as delimiters, and indicate if the records are variable length to the Output Generator.

\* \* \* \* \*